Feb. 13, 1962 D. M. MacMILLIN 3,021,040
MOTION PICTURE DEVICES
Filed June 3, 1957 4 Sheets-Sheet 1
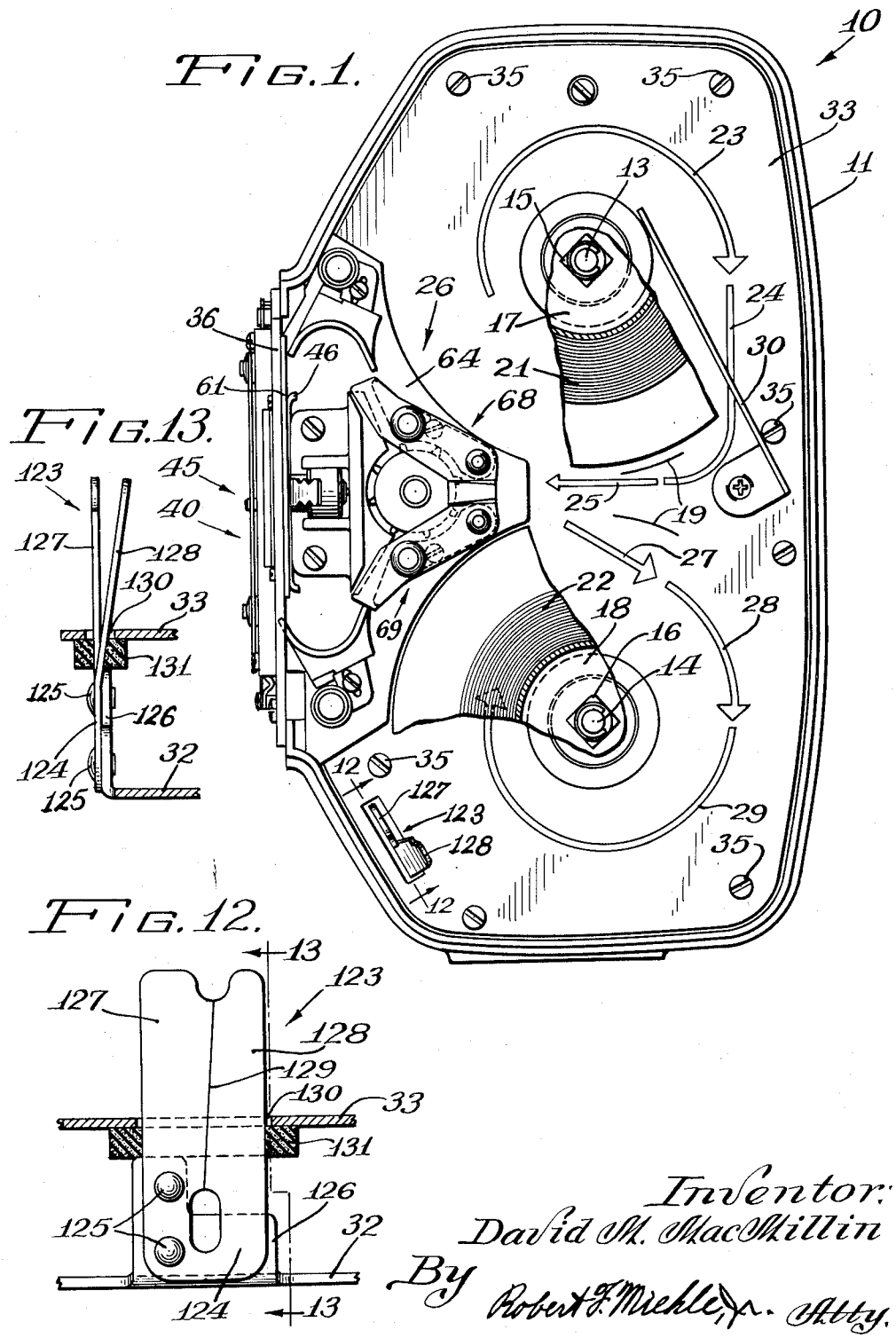
Inventor:
David M. MacMillin
By Robert F. Miehle, Jr. Atty.

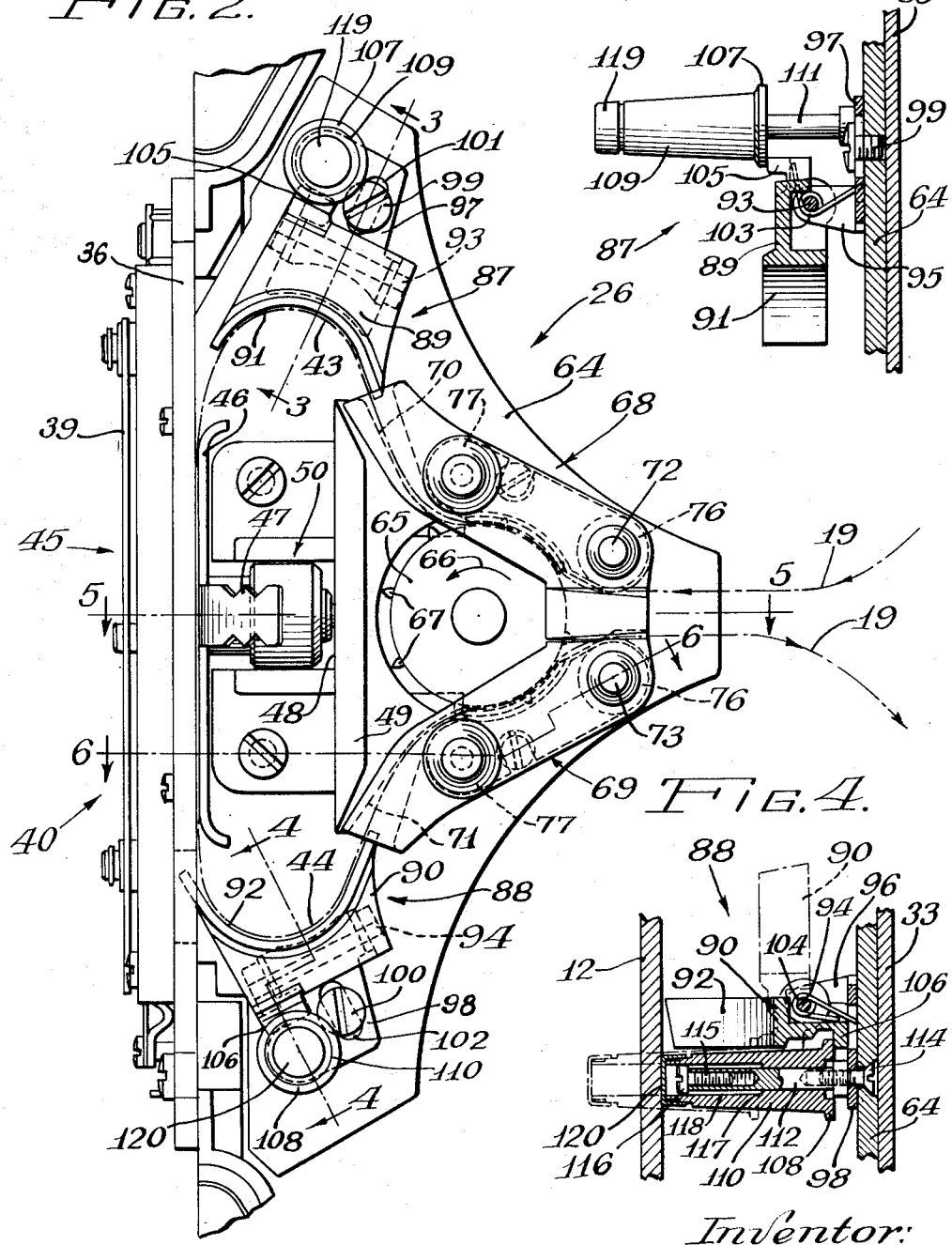

Feb. 13, 1962 D. M. MacMILLIN 3,021,040
MOTION PICTURE DEVICES
Filed June 3, 1957 4 Sheets-Sheet 3
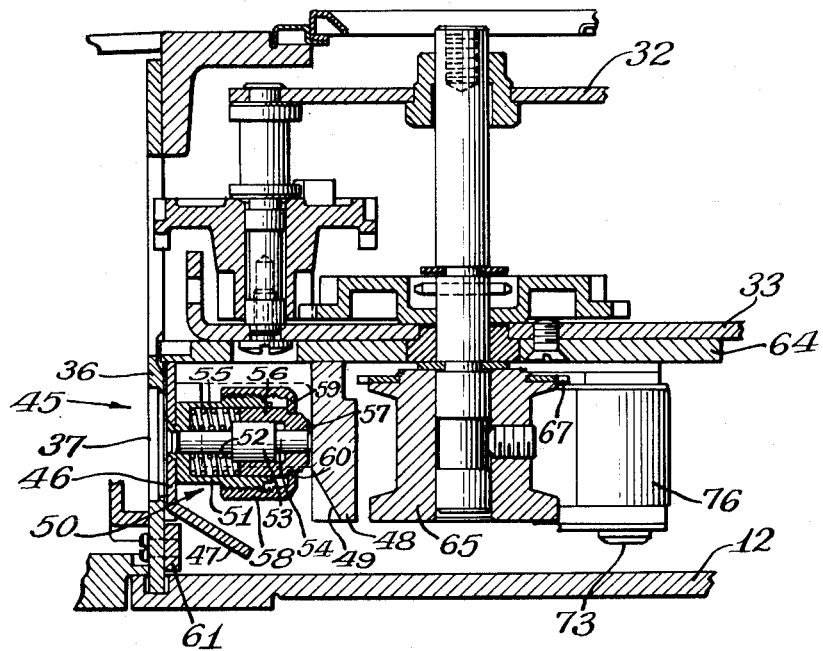
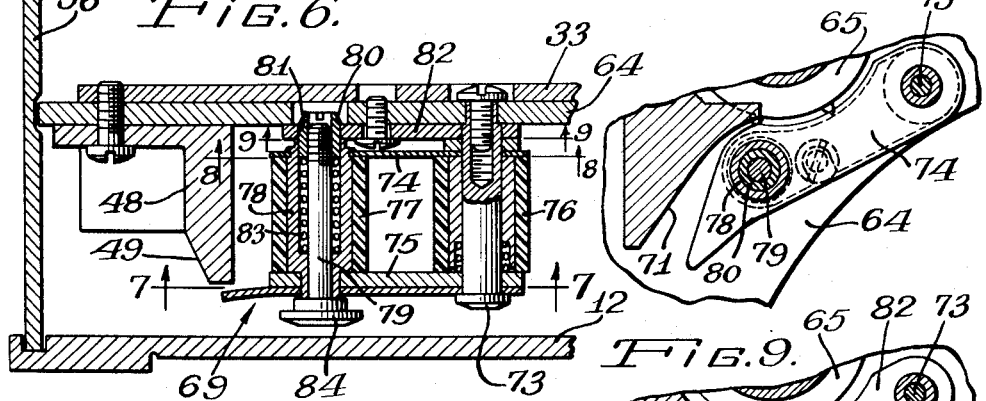
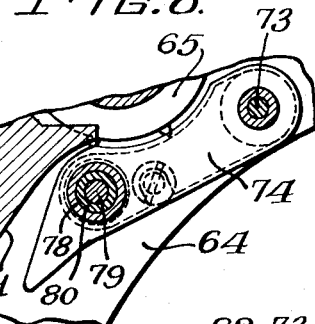
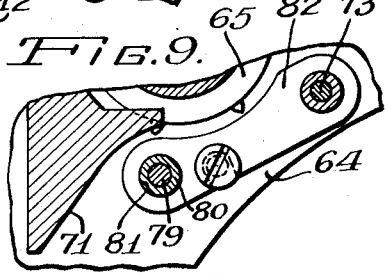
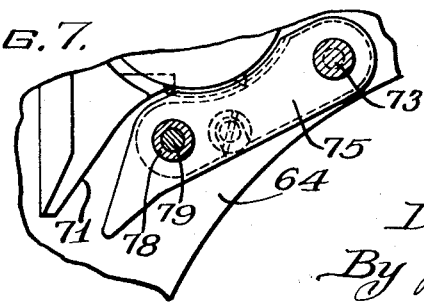
Inventor:
David M. MacMillin
By Robert F. Miehle, Jr. Atty.

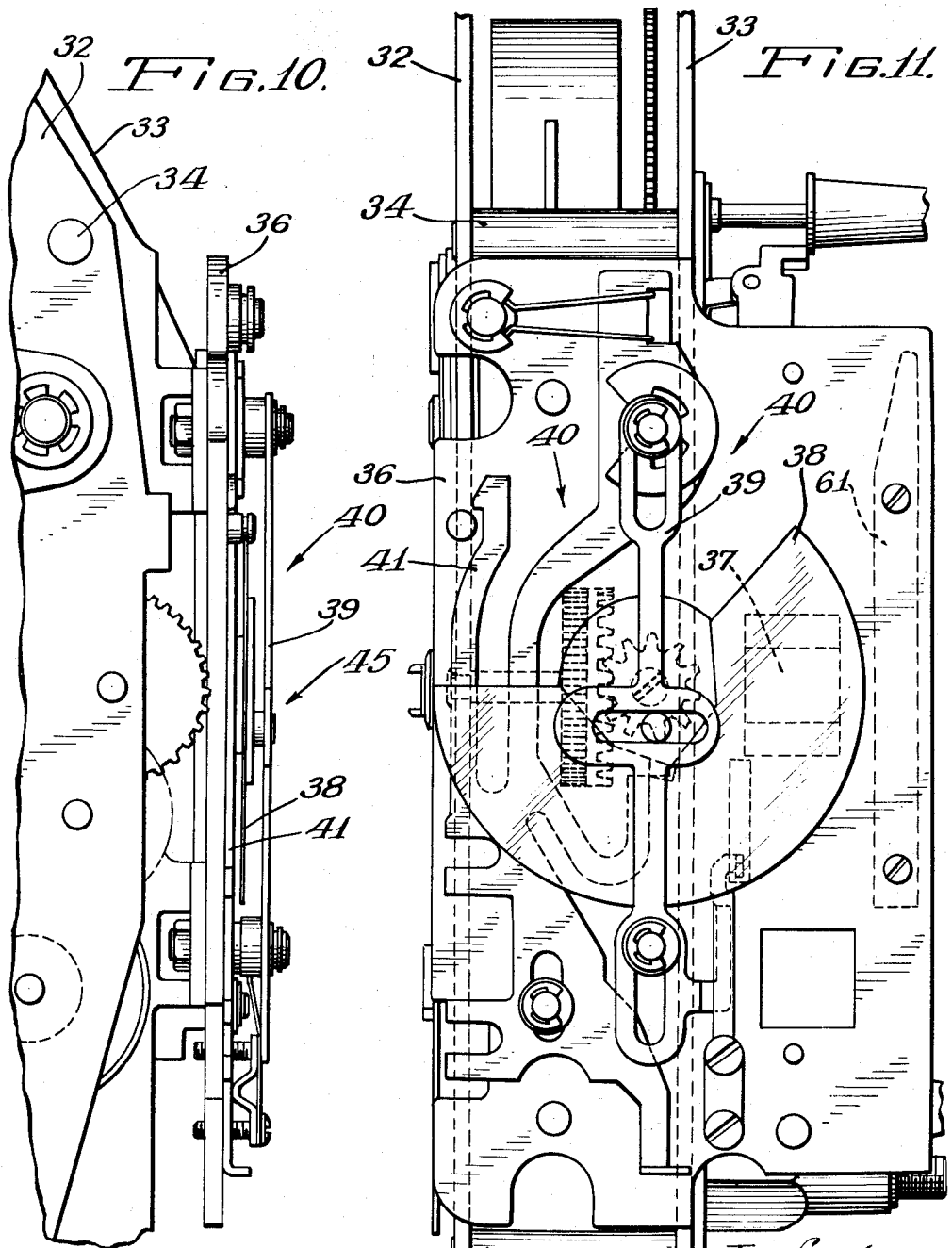

2,021,040
Patented Feb. 13, 1962

3,021,040
MOTION PICTURE DEVICES
David M. MacMillin, Wilmette, Ill., assignor to Bell & Howell Company, Chicago, Ill., a corporation of Illinois
Filed June 3, 1957, Ser. No. 663,215
8 Claims. (Cl. 226—91)

This invention relates, generally, to motion picture devices and it has particular relation to motion picture cameras.

Among the objects of this invention are: To provide for self threading the film of a motion picture device, such as a camera, in a new and improved manner; to mount loop formers above and below the intermittent film feed mechanism in such manner as to permit movement thereof to positions along the paths of the film loops initially to form the same and thereafter away from such positions to leave the loops free; to rockably mount the loop formers about axes in a plane containing the loops; to control the positions of the loop formers by the removable cover for the case containing the motion picture mechanism; to swing the loop formers into operative positions when the cover is removed and to inoperative positions when it is applied to the case in operative position; to provide in the case for cutting the lead end of the film on a bias to facilitate threading; and to hold the pressure shoe of the film gate in place and provide for ready removal thereof without requiring that it be hinged.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

FIGURE 1 is a side elevational view of a motion picture camera in which the present invention is embodied showing the internal details of construction in elevation, the cover for the case being removed;

FIGURE 2 is an enlarged elevational view of the film gate and certain of the feed mechanism parts associated therewith including the movable loop formers that form an important part of this invention;

FIGURE 3 is a sectional view taken generally along the line 3—3 of FIGURE 2;

FIGURE 4 is a sectional view taken generally along the line 4—4 of FIGURE 2;

FIGURE 5 is a horizontal sectional view taken generally along the line 5—5 of FIGURE 2;

FIGURE 6 is a sectional view taken generally along the line 6—6 of FIGURE 2;

FIGURE 7 is a sectional view taken generally along the line 7—7 of FIGURE 6;

FIGURE 8 is a sectional view taken generally along the line 8—8 of FIGURE 6;

FIGURE 9 is a sectional view taken generally along the line 9—9 of FIGURE 6;

FIGURE 10 is a rear elevational view of a portion of the mechanism shown in FIGURE 2;

FIGURE 11 is an elevational view at an enlarged scale of the intermittent film feed mechanism looking from right to left of FIGURE 10;

FIGURE 12 is a sectional view taken generally along the line 12—12 of FIGURE 1 and showing the film cutter; and FIGURE 13 is a sectional view taken generally along the line 13—13 of FIGURE 12.

Referring now to the drawings and particularly to FIGURE 1 thereof it will be observed that the reference character 10 designates, generally, a motion picture camera in which the present invention is embodied. The camera 10 is housed in a case 11 having a cover 12 portions of which are shown in FIGURES 4, 5 and 6. The cover 12 is removably mounted on the case 11 in a manner disclosed in more detail in copending application Serial No. 657,522, filed May 7, 1957, now Patent No. 2,959,091, and assigned to the assignee of this application. Since many of the details of construction of the motion picture camera 10 are disclosed in the above application and form no part of the present invention, they are not described herein.

The camera mechanism includes upper and lower vertically spaced studs 13 and 14 on which upper and lower film spindles 15 and 16 are mounted for detachably receiving upper and lower film reels 17 and 18 in a manner well understood. The unexposed film 19 that is to be unwound from the upper film reel 17 is indicated thereon at 21 while the exposed film is wound on the lower film reel 18 as indicated at 22. The path of the unexposed film 21 at its unwinds from the upper film reel 17 is indicated by the arrows 23, 24 and 25. It will be understood that the film 19 is fed to and from film feed mechanism, indicated generally at 26, to expose the same, the film feed mechanism 26 being driven by a spring motor as disclosed in more detail in the above application. The path of the exposed film 19 on leaving the film feed film mechanism 26 is indicated by the arrows 27, 28 and 29. As pointed out it is wound on the lower film reel 18 as indicated at 22. A film finger 30 maintains contact with the unexposed film 21 on the upper film reel 17 and provides, as disclosed in the application above referred to, an indication of the amount of film remaining.

The camera mechanism is mounted in the case 11 between and on an outer plate 32 and a central plate 33. These plates are spaced apart by pillars 34, FIGURE 11, and are held together by screws 35, FIGURE 1.

Mounted on the central plate 33, as shown in FIGURES 5 and 11, is an aperture plate 36 which is provided with an aperture 37 to permit exposure of the film 19. The aperture 37 is intermittently covered and opened by a rotatable shutter 38 which operates in conjunction with a reciprocatory shuttle 39 to advance the film 19 in a stepwise fashion in accordance with conventional practice. The shuttle 39 forms a part of an intermittent film feed mechanism that is indicated generally at 40 and is arranged to be driven mechanically by suitable means such as the spring motor disclosed in the application above referred to. A control slide 41 is employed for starting and stopping the intermittent film feed mechanism 40 to operate either continuously or on a frame by frame basis.

Referring now particularly to FIGURE 2 of the drawings, it will be observed that the film 19 is formed into an upper film loop 43 above the intermittent film feed mechanism 40 and into a lower film loop 44 therebelow. These loops 43 and 44 are provided in order to permit free intermittent movement of the film 19 through the film gate which is indicated, generally, at 45. The free film loops 43 and 44 permit the stepwise advance of the film 19 past the aperture 37 with a minimum of frictional resistance.

As shown more clearly in FIGURE 5 the film gate 45 includes a pressure shoe 46 which overlies the aperture 37 and is disposed to the rear of the aperture plate 36. It will be understood that the film 19 is fed between the rear surface of the aperture plate 36 and the juxtaposed surface of the pressure shoe 46. It is desirable that the pressure shoe 46 be held with a relatively light force against the film in order to insure that it is in fixed relation with respect to the aperture 37. On the other hand the force should not be so great as to interfere with the proper stepwise movement of the film.

It is desirable to provide for application and removal of the pressure shoe 46 without requiring that it be provided with a hinge type of mounting. For this purpose a handle 47 is formed integrally with the pressure shoe 46 and, by grasping it and employing the mechanism to be described, it is possible to remove the pressure shoe 46 for inspection and cleaning purposes. Spaced rearwardly from the aperture plate 36 is an abutment 48 which is beveled as indicated 49 to facilitate application and removal of a retainer that is indicated, generally, at 50 and which serves to hold the pressure shoe 46 in position without requiring that it be hingedly mounted.

The retainer 50 includes a cup 51 which is rigidly secured to the pressure shoe 46 substantially midway its ends and within it is a relatively light coil compression spring 52 which is arranged to react between the bottom of the cup 51 and one side of a shouldered portion 53 that is formed integrally with a pin 54 the right hand end of which bears against the abutment 48. Under normal conditions the pressure shoe 46 is held in position against the film only by the force exerted by inner relatively light spring 52 which, as described, reacts against the bottom of the cup 51 and the pin 54 which, in turn bears against the abutment 48.

Since the stroke of the pin 54 is necessarily relatively short, it is possible to take advantage of this arrangement and employ an outer relatively heavy spring 55 in the cup 51 for holding the retainer 50 in place when it is displaced beyond the relatively short throw of the pin 54. It will be noted that the spring 55 surrounds the inner spring 52, is a coil compression spring and at one end bears against the bottom of the cup 51 while the other end bears against a sleeve 56 through which the pin 54 projects. The end 57 of the sleeve 56 through which the pin 54 projects is spaced a slight distance from the abutment 48 and it is held in this position by a nut 58 which is threaded on the cup 51 and has a radially inwardly extending flange 59 which engages a shoulder 60 on the sleeve 56. The nut 58 is so positioned that the end 57 is spaced the proper amount from the abutment 48 which, while preventing action by the outer relatively heavy spring 55, permits the inner relatively light spring 52 to apply its force between the abutment 48 and the pressure shoe 46 to hold the latter in position against the film. However, when it is desired to remove the pressure shoe 46 from the position shown in FIGURE 5 and over a rail 61 which holds it laterally in position, the handle 47 is grasped and the pressure shoe 46 is rocked slightly toward the abutment 48. The pin 54 is depressed and the end 57 of the sleeve 56 engages the abutment and moves inwardly of the cup 51 thereby further stressing the outer relatively heavy spring 55. Sufficient inward movement of the sleeve 56 takes place to permit the pressure shoe 46 to clear the rail 61 whereupon it and the retainer 50 are bodily removed. Since the left hand end of the pin 54 is freely slidable through an opening in the bottom of the cup 51 and further since the right hand end of the shoulder portion 53 is spaced from the inner side of the end 57 of the sleeve 56, the latter can move inwardly the required distance to permit the removal of the pressure shoe 46 and retainer 50. The beveled portion 49 of the abutment 48 facilitates the removal and return of the pressure shoe 46 and retainer 50.

As shown in FIGURE 2 a portion of the film feed mechanism 26 is mounted on a plate 64 which is carried by the central plate 33, FIGURES 5 and 6. Rotatably mounted above the plate 64 is a constant speed sprocket 65 which is driven in the direction indicated by the arrow 66 by suitable means, such as the spring motor shown in the application above referred to. The sprocket 65 is provided with radially projecting teeth 67 for interfitting with sprocket openings in the film 19 in accordance with conventional practice. Associated with the sprocket 65 are upper and lower film guides 68 and 69 which cooperate with upper and lower guide surfaces 70 and 71 on the abutment 48 to direct the film 19 to and from the upper and lower film loops 43 and 44 respectively. The film guides 68 and 69 are pivotally mounted at 72 and 73 on the plate 64. Since the construction of the upper and lower film guides 68 and 69 is the same a detailed description of the lower film guide 69 will be sufficient for present purposes.

The construction of the lower film guide 69 is shown more clearly in FIGURES 6–9 of the drawings to which reference now will be had. The film guide 69 comprises a frame which is formed, in part, by inner and outer plates 74 and 75 between which guide rollers 76 and 77 are rotatably mounted. The guide roller 76 is mounted to rotate about the pivot 73 which also provides a pivot axis for the film guide 69 in its entirety. The guide roller 77 is rotatably mounted on a sleeve 78 through which a pin 79 extends. The sleeve 78 is secured to the inner plate 74 and the pin 79 has a cylindrical nut 80 threaded on its inner end and it interfits in an opening 81 in a plate 82 which is secured to the plate 64. Surrounding the pin 79 and located inside of the sleeve 78 is a coil compression spring 83 which urges the pin 79 inwardly and the nut 80 into the opening 81. A head 84 at the outer end of the pin 79 permits it to be lifted in order to remove the nut 80 from the opening 81. This permits the film guide 59 to be swung about the axis 73 and gives access to the sprocket 65 when it is necessary to inspect it, remove damaged film, etc. Normally the film guides 68 and 69 remain in the positions shown in FIGURE 2 where the rollers 76 and 77 thereof cooperate with the sprocket 65 in guiding the film 19 to and from the upper and lower loops 43 and 44.

In accordance with the present invention provision is made for self threading the film 19 into and out of the film feed mechanism 26 and to form the upper and lower film loops 43 and 44. This simplifies the loading of the camera 10 and also insures that it is properly loaded and that the film loops 43 and 44 are properly formed.

The mechanism providing the self threading operation is illustrated more clearly in FIGURES 2, 3 and 4 of the drawings. There it will be noted that upper and lower loop formers 87 and 88 are provided above and below the intermittent film feed mechanism 40 and in conjunction with the upper and lower film loops 43 and 44. FIGURE 3 shows the upper loop former 87 with the cover 12 removed from closed position while FIGURE 4 shows the lower loop former 88 with the cover 12 in the closed position.

It will be noted that the loop formers 87 and 88 each include a body portion 89 and 90 that are provided, respectively, with upper and lower loop forming arcuate surfaces 91 and 92. These surfaces, as shown in FIGURE 2, are located along the paths of the upper and lower film loops 43 and 44 and occupy these positions when the cover 12 is removed. They accurately locate the film loops 43 and 44. However, since it is desired that these film loops be free for operation of the camera, provision is made for swinging the body portions 89 and 90 carrying the arcuate surfaces 91 and 92 about axes in a plane containing the the film loops away from the paths of the upper and lower film loops 43 and 44 when the cover 12 is replaced.

The body portions 89 and 90 are rockably mounted on pivot pins 93 and 94 which extend through ears 95 and 96 that are struck up from support plates 97 and 98, respectively, which may be secured, in part, by screws 99 and 100 to the plate 64. It will be noted that the screws 99 and 100 extend through slots 101 and 102 in the plates 97 and 98. This construction permits some adjustment of the positions of the arcuate surfaces 91 and 92 that may be required during assembly. The body portions 89 and 90 of the loop formers 87 and 88 are biased to the loop forming positions by means of springs 103 and 104 which, as shown more clearly in FIGURES 3 and 4, are wound around the pivot pins 93 and 94 with one end of each reacting against the respective body portion 89 or 90 while the other end reacts against the respective plate 97 or 98.

As indicated hereinbefore, provision is made for moving the body portions 89 and 90 carrying the loop forming surfaces 91 and 92 out of the paths of the film loops 43 and 44 when the cover 12 is replaced. For this purpose detents 105 and 106 are formed integrally with the body portions 89 and 90 and they are engaged by radial flanges 107 and 108 which are located at the base of each of sleeves 109 and 110 that are guided from the central plate 33 by pins 111 and 112 telescoped within the sleeves, for movement transverse to the axes of rocking movement of the loop formers 87 and 88. FIGURE 4 shows the manner in which the pins 111 and 112 are mounted on the support plates 97 and 98. Here it will be observed that a screw 114 extends through the plate 64 and the plate 98 and that it is threaded into the bottom of the pin 112. This provides further holding means for the plate 98 in attaching it to the plate 64. At the outer end of the pin 112 there is a screw 115 having a head 116 which is arranged to be engaged by a shoulder 117 at the bottom of a counterbore 118 in the sleeve 110. This construction limits the outward movement of the sleeve 110 to the position shown by the broken lines in FIGURE 4 under the influence of the spring 104. The alternate position of the body portion 90 is also shown in FIGURE 4 by broken lines. Caps 119 and 120 overlie the outer ends of the sleeves 109 and 110 and it is against the outer surfaces thereof that the cover 12 bears when it is in the closed position to hold the loop formers in inoperative position. FIGURE 4 shows the lower loop former 88 in inoperative position by full lines when the cover 12 is closed. FIGURE 3 shows the upper loop former 87 in operative position with the cover 12 removed.

The threading of the film 19 is facilitated if the leading end is cut slightly on a bias. For this purpose a film cutter, shown generally at 123, in FIGURES 12 and 13 can be used. The film cutter 123 includes a blade member 124 that is secured by rivets 125 to a tab 126 which is struck up from the outer plate 32. The blade member 124 has an upright blade section 127 and an inclined blade section 128 which are arranged to meet along inclined cutting edges as indicated at 129. The blade member 124 extends through an opening 130 in the central plate 33 and below it is surrounded by a section of resilient material 131 that is employed to prevent vibration of the blade sections 127 and 128.

In operation, when it is desired to load the camera 10, the cover 12 is removed by removing the thumb nuts described in the application above referred to. As soon as the cover 12 is removed, the springs 103 and 104 are no longer restrained by the depression of the sleeves 109 and 110 and they bias the loop formers 87 and 88 to the operative positions shown in FIGURES 1, 2 and 3 of the drawings. If the film to be used does not have a satisfactory lead end, a small portion of the lead end is placed behind the upright blade section 127 and extended past the juxtaposed edge of the inclined blade section 128. The latter is then moved toward the former and the desired bias is provided on the lead end of the film by cutting off a small portion thereof. It is assumed that an empty film reel 18 is mounted on the lower film spindle 16. The unexposed film on the upper film reel 17 now is ready for self threading. The upper film reel 17 is placed in position on the upper film spindle 15 so that the film 21 thereon will unwind in the direction indicated by the arrows 23, 24 and 25. The lead end of the film 19 then is pushed between the roller 76 of the upper film guide 68 and the upper side of the sprocket 65. Then the control slide 41 is operated by the conventional release mechanism of the camera to drive the sprocket 65 in the direction indicated by the arrow 66 of FIGURE 2. The film 19 is then fed past the guide roller 77 of the upper film guide 68 and is directed by the upper guide surface 70 on the abutment 48 to engage the upper loop forming arcuate surface 91 on the upper loop former 87. The upper loop 43 is then formed and the lead end of the film then is directed downwardly through the film gate 45 and past the pressure shoe 46. The lead end continues downwardly until it engages the lower loop forming arcuate surface 92 where the continued movement of the film 19 forms the lower film loop 44. The film then is directed upwardly against the lower guide surface 71 on the abutment 48 and between the guide rollers 77 on the lower film guide 69 and the lower side of the sprocket 65. Then it is picked up by the teeth 67 thereof and carried over the roller 76 and outwardly thereof. A sufficient length is obtained to permit threading onto the lower film reel 18. After this is accomplished, the cover 12 is replaced. When this occurs the sleeves 109 and 110 are depressed to the position illustrated in FIGURE 4. This action rocks the loop formers 87 and 88 to the inoperative position shown in FIGURE 4 leaving the loops 43 and 44 free.

The camera now is fully loaded and ready for operation.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a self threading motion picture device, in combination, a mechanism plate, intermittent film feed means, a film sprocket for feeding film in loops above and to and from and below said intermittent film feed means, film guides above and below said film sprocket for guiding the film to and from said loops and maintaining it in operative relation to said film sprocket, a loop former for each loop, means for mounting said loop formers on said mechanism plate, said loop formers having arcuate surfaces along which the film loops are formed, said mounting means rockably mounting said loop formers about axes in a plane parallel to said plate, spring means biasing said loop formers into loop forming positions, and means operatively engaging each loop former for rocking the same against the biasing action of its spring means to inoperative position thereby freeing said loops.

2. In a self-threading motion picture camera including a case for retaining film therein, intermittent film feed means in the case, cover removable from a position closing the case, the combination therewith of a U-shaped loop former having an arcuate surface along which the film loop is formed, means mounting the loop former in the case for pivotal movement between a loop forming position and a retracted position spaced from the loop, spring means urging the loop former toward its loop forming position, and actuating means urged by the spring means toward a position in the path of the cover as it is moved to close the case and operable by the cover to move the loop former against the action of the spring means from its loop forming position to its retracted position.

3. In a camera including apertured film guiding means and sprocket means for advancing film toward one end of the film guiding means and away from the other end thereof, the improvement comprising a pair of completely separate and distinct loop forming units positioned at opposite ends of the film guiding means, each of the units including a mounting bracket member and a loop forming member pivotal on the bracket member between a retracted position and a loop forming position, each of the units also including spring means biasing the loop forming member thereof toward its loop forming position and a pusher member for moving the loop forming member thereof to its retracted position, and a cover operable as it is closed to engage each of the pusher members to move each of the loop forming members to the retracted position thereof.

4. The camera of claim 3 and including a mechanism plate, means mounting the film guiding means and the sprocket means on the mechanism plate, and a pair of completely separate and distinct means each mounting the bracket member of one of the units adjustably on the mechanism plate for adjustment relative to the sprocket means and the film guiding means to vary the size of the loop formed by loop forming member of the last-mentioned one of the units.

5. A loop forming unit comprising a mounting bracket member, a loop forming member, means mounting the loop forming member pivotally on the bracket member, a spring urging the loop forming member toward a loop forming position, a guide member mounted on the bracket member, and a pusher member slidable along the guide member for moving the loop forming member to a retracted position.

6. A loop forming unit comprising a plate-like mounting bracket, a pintle carried by the bracket in a position parallel thereto, a loop former pivotally mounted on the pintle, a spring urging the loop former toward a position in which the loop former is approximately parallel to the bracket, a guide rod rigid on the bracket and extending perpendicularly from the bracket, and a sleeve-like pusher slidable on the guide rod, the pusher and the loop former being provided with interengaging portions such as to move the loop former to a position approximately perpendicular to the bracket when the pusher is slid along the rod toward the bracket.

7. In an apparatus of the class described including apertured film guiding means for guiding a film along a predetermined path and sprocket means for advancing the film toward one end of said path and away from the other end of said path, the improvement comprising first loop forming means movable between a retracted position and a loop forming position for guiding the film from the sprocket means to said one end of said path, first mounting means mounting the first loop forming means adjustably relative to the sprocket means and the film guiding means for adjusting the size of the loop of film formed therebetween, a second loop forming means movable between a retracted position and a loop forming position for guiding the film from said second end of said path to the sprocket means, second mounting means entirely separate and distinct from the first mounting means and mounting the second loop forming means adjustably relative to the sprocket means and the film guiding means for adjusting the size of the loop of film formed therebetween, a closable cover, spring means normally urging the first and second loop forming means toward the loop forming positions thereof, and actuating means operable by the cover to move the first and second loop forming means to the retracted positions thereof.

8. In an apparatus of the class described including apertured film guiding means for guiding a film along a predetermined path and sprocket means for advancing the film toward one end of said path and away from the other end of said path, the improvement comprising first loop forming means movable between a retracted position and a loop forming position for guiding the film from the sprocket means to said one end of said path, first mounting means mounting the first loop forming means adjustably relative to the sprocket means and the film guiding means for adjusting the size of the loop of film formed therebetween, second loop forming means movable between a retracted position and a loop forming position for guiding the film from said second end of said path to the sprocket means, second mounting means entirely separate and distinct from the first mounting means and mounting the second loop forming means adjustably relative to the sprocket means and the film guiding means for adjusting the size of the loop of film formed therebetween, a closeable cover movable between an open position and a closed position, each of the first and second loop forming means being entirely separate from and independent of the other and each of the first and second loop forming means including actuating means operable by closing movement of the cover for retracting the loop forming means.

References Cited in the file of this patent

UNITED STATES PATENTS

| | | |
|---|---|---|
| 1,714,461 | Chainier et al. | May 21, 1929 |
| 1,865,107 | Howell | June 28, 1932 |
| 1,997,409 | May | Apr. 9, 1935 |
| 2,203,655 | Lechleitner et al. | June 4, 1940 |
| 2,327,857 | Bolsey | Aug. 24, 1943 |
| 2,396,243 | Boisselier | Mar. 12, 1946 |
| 2,420,587 | Dietrich | May 13, 1947 |
| 2,457,915 | Nemeth | Jan. 4, 1949 |
| 2,497,847 | Coutant et al. | Feb. 21, 1950 |
| 2,506,765 | Bach | May 9, 1950 |
| 2,832,258 | Chevallaz | Apr. 29, 1958 |

FOREIGN PATENTS

| | | |
|---|---|---|
| 391,250 | Great Britain | Apr. 27, 1933 |
| 409,882 | Great Britain | May 10, 1934 |
| 563,308 | Great Britain | Aug. 9, 1944 |
| 244,068 | Switzerland | Feb. 17, 1947 |
| 471,740 | Canada | Feb. 27, 1951 |
| 1,123,472 | France | June 11, 1956 |